United States Patent
Savage et al.

(10) Patent No.: US 10,713,363 B2
(45) Date of Patent: Jul. 14, 2020

(54) SYSTEM AND METHOD OF CONFIGURING INFORMATION HANDLING SYSTEMS

(71) Applicant: Dell Products L.P., Round Rock, TX (US)

(72) Inventors: Marshal F. Savage, Austin, TX (US); Jason Matthew Young, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 116 days.

(21) Appl. No.: 15/964,595

(22) Filed: Apr. 27, 2018

(65) Prior Publication Data
US 2019/0332775 A1  Oct. 31, 2019

(51) Int. Cl.
*G06F 21/57* (2013.01)
*H04L 12/24* (2006.01)
*G06F 21/62* (2013.01)
*H04L 9/32* (2006.01)
*H04L 9/00* (2006.01)

(52) U.S. Cl.
CPC ........ *G06F 21/572* (2013.01); *G06F 21/6218* (2013.01); *H04L 9/321* (2013.01); *H04L 9/3247* (2013.01); *H04L 9/3268* (2013.01); *H04L 41/0806* (2013.01); *H04L 9/006* (2013.01)

(58) Field of Classification Search
CPC ....... G06F 9/44505; G06F 8/65; G06F 15/177
USPC .......................................................... 713/1
See application file for complete search history.

(56) References Cited

U.S. PATENT DOCUMENTS

| | | | | |
|---|---|---|---|---|
| 7,577,828 | B2 * | 8/2009 | Sammer | G06F 11/006 713/1 |
| 8,724,515 | B2 * | 5/2014 | Averbuch | H04L 41/0806 370/255 |
| 8,874,922 | B2 * | 10/2014 | Jaber | G06F 21/57 713/153 |
| 10,102,378 | B2 * | 10/2018 | Oh | G06F 21/53 |
| 10,135,840 | B2 * | 11/2018 | Jesurajan Marystella | G06F 9/4416 |
| 10,263,778 | B1 * | 4/2019 | Grubin | H04L 63/0435 |

(Continued)

OTHER PUBLICATIONS

D. Cooper et al., "Internet X.509 Public Key Infrastructure Certificate and Certificate Revocation List (CRL) Profile", Network Working Group RFC 5280, May 2008, 151 Pages.

(Continued)

*Primary Examiner* — Brian T Misiura
(74) *Attorney, Agent, or Firm* — Baker Botts L.L.P.

(57) ABSTRACT

In one or more embodiments, one or more systems, methods, and/or processes may receive a digital signature, signed by a signing authority, for a request for utilization of an information handling system firmware application programming interface (API) of the information handling system firmware, signed based at least on information associated with a certificate signed by a certificate authority; may determine that the signing authority is authorized for the request for utilization of the information handling system firmware API; may determine that the signing authority is authorized for the request for utilization of the information handling system firmware API on a platform model of the information handling system; may determine that the certificate is not on a certificate revocation list; and may permit utilization of the information handling system firmware API.

18 Claims, 7 Drawing Sheets

(56) References Cited

U.S. PATENT DOCUMENTS

2009/0319804 A1* 12/2009 Qi .................. G06F 9/30145
                                                    713/190
2019/0042707 A1*  2/2019 Young ............... G06F 21/105
2019/0065786 A1*  2/2019 Young ............... G06F 21/74

OTHER PUBLICATIONS

S. Kent,"Privacy Enhancement for Internet Electronic Mail: Part II: Certificate-Based Key management", network Working Group RFC 1422, Feb. 1993, 32 pages.

* cited by examiner

SYSTEM AND METHOD OF CONFIGURING INFORMATION HANDLING SYSTEMS

BACKGROUND

Field of the Disclosure

This disclosure relates generally to information handling systems and more particularly to configuring information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may receive a digital signature, signed by a signing authority, for a request for utilization of an information handling system firmware application programming interface (API) of the information handling system firmware, signed based at least on information associated with a certificate signed by a certificate authority; may decrypt the digital signature, utilizing a public key associated with the certificate, to determine a first hash value; may determine a second hash value of the request for utilization of the information handling system firmware API; may determine that the first hash value matches the second hash value; may determine that the signing authority is authorized for the request for utilization of the information handling system firmware API; may determine that the signing authority is authorized for the request for utilization of the information handling system firmware API on a platform model of the information handling system; may determine that the certificate is not on a certificate revocation list; may and permit utilization of the information handling system firmware API. In one or more embodiments, utilization of another information handling system firmware API may be permitted without authorization. In one or more embodiments, the information handling system firmware API may be utilized to configure at least a portion of the information handling system. In one or more embodiments, the certificate authority may be a brand entity of the information handling system. For example, the brand entity of the information handling system may be Dell Products, L.P. In one or more embodiments, the remote access controller may include the certificate revocation list. For example, firmware of the remote access controller may include the certificate revocation list. For instance, the remote access controller may access its firmware to access the certificate revocation list. In one or more embodiments, the remote access controller may access a network for the certificate revocation list.

In one or more embodiments, determining that the signing authority is authorized for the request for utilization of the information handling system firmware API may include determining one or more scope qualifiers from the certificate and determining that at least one of the one or more scope qualifiers is associated with utilization of the information handling system firmware API. In one or more embodiments, the signing authority may be or include a hardware security module. For example, the hardware security module may be a hardware security module of a manufacturer. For instance, the brand entity of the information handling system may instruct the manufacturer to build and/or configure one or more portions of the information handling system.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
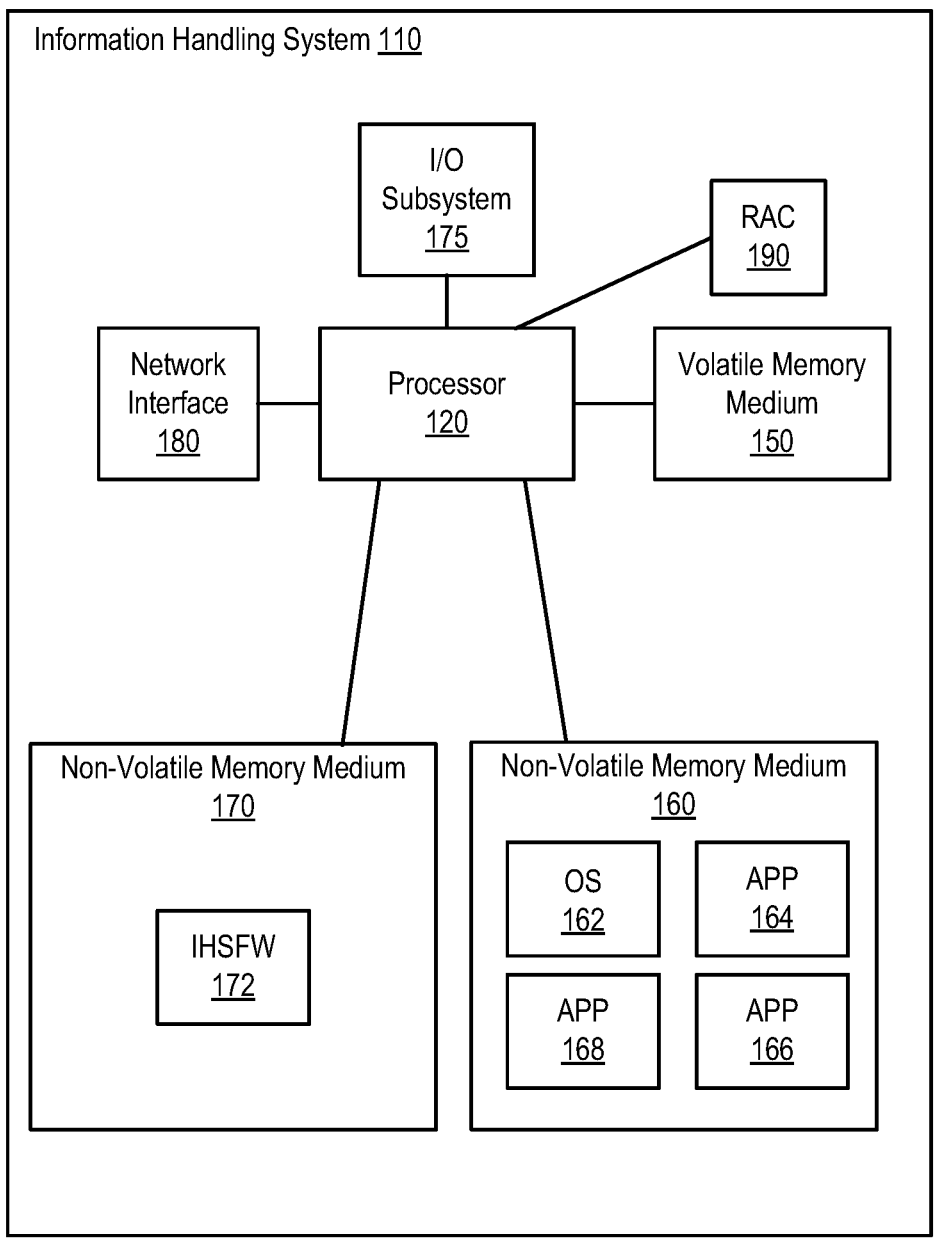
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a manufacturing facility of information handling systems may interact with one or more systems and/or subsystems of the information handling systems. For example, the manufacturing facility may access one or more application programming interfaces (APIs) of information handling system firmware in a manufacturing process. For instance, the manufacturing facility may utilize the APIs of the information handling system firmware to configure one or more portions of the information handling system, such as one or more systems and/or subsystems of the information handling systems. In one or more embodiments, configuring the one or more portions of the information handling systems may include storing data and/or firmware to and/or via the one or more systems and/or subsystems of the information handling systems. In one example, the manufacturing facility may utilize the APIs of the information handling system firmware to store a service tag, one or more media access control addresses (MACs), and a piece part identifier (PPID), among others. For instance, a PPID may be or include a hash value (e.g., a one-way hash value, a cryptographic hash value, etc.). In a second example, the manufacturing facility may utilize the APIs to store a service tag to non-volatile memory of an information handling system. In a third example, the manufacturing facility may utilize the APIs to store one or more MACs to respective one or more network interfaces of an information handling system. In another example, the manufacturing facility may utilize the APIs to store a PPID to a motherboard of an information handling system.

In one or more embodiments, a PPID may be unique to a component. In one example, a component may be or include an integrated circuit (IC). For instance, an IC may be or include a "chip". In a second example, a component may be or include a set of integrated circuits (ICs). For instance, component may be or include a subsystem of an information handling system that includes a set of ICs. In another example, component may be or include a network interface (e.g., a network "card", a networking subsystem, etc.), a universal serial bus interface, or a storage device, among others. In one or more embodiments, a PPID of a component may be stored by the component. In one example, a PPID of a component may be stored by the component in a permanent fashion. For example, the PPID of the component may not be altered. In another example, a PPID of a component may be stored by the component in a semi-permanent fashion. In one instance, the PPID of the component may be altered via a process (e.g., via a secure process). In another instance, the PPID of the component may be stored via non-volatile storage of the component.

In one or more embodiments, a potential vulnerability and/or security issue may emerge and/or ensue if an entity outside the manufacturing process of the information handling system can access the APIs of the information handling system firmware to configure one or more systems and/or subsystems of the information handling systems. In one example, one or more of the APIs may be discovered by an entity outside the manufacturing process. In another example, a person that has knowledge of the manufacturing process and/or the APIs may disseminate information associated with the APIs.

In one or more embodiments, one or more authorization systems, methods and/or processes and/or one or more authentication systems, methods and/or processes may be utilized with the APIs. For example, access of the APIs may be controlled, managed, and/or regulated via the one or more authorization systems, methods and/or processes and/or the one or more authentication systems, methods and/or processes. In one or more embodiments, multiple authorizations may be utilized to invoke the APIs. For example, the APIs may be or include one or more manufacturing APIs. For instance, the one or more manufacturing APIs may be utilized during one or more manufacturing processes of building and/or configuring an information handling system. In one or more embodiments, dual authorization may be utilized to invoke APIs of information handling system firmware in a manufacturing process. For example, a manufacturing facility may access, via dual authorization, one or more APIs of information handling system firmware in a manufacturing process. For instance, the manufacturing facility may utilize dual authorization to access the APIs of the information handling system firmware to configure one or more systems and/or subsystems of the information handling systems.

In one or more embodiments, a first level authorization may include utilizing one or more digital certificates and/or one or more digital signatures. In one example, a request to utilize one or more APIs may be signed by a digital signature. For instance, the one or more APIs may be signed by the digital signature may be or include one or more manufacturing APIs signed by a digital signature. In another example, a digital certificate may be utilized in authenticating one or more digital signatures. In one or more embodiments, a second level authorization may include utilizing one or more user credentials. For example, the one or more user credentials may include a user name and a password combination.

In one or more embodiments, one or more modular systems may include a remote access controller (RAC). For example, the remote access controller may be or include a Dell Remote Access Controller (DRAC). In one or more embodiments, a remote access controller may be integrated into an information handling system. For example, the remote access controller may be or include an integrated Dell Remote Access Controller (iDRAC). In one or more embodiments, a remote access controller may include one or more of a processor, a memory, and a network interface, among others. In one or more embodiments, a remote access controller may access one or more busses and/or one or more portions of an information handling system. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller (BMC) integrated circuits. For example, the remote access controller may be based at least on an Intelligent Platform Management Interface (IPMI) standard. For instance, the remote access controller may allow and/or permit utilization of IPMI out-of-band interfaces such as IPMI Over LAN (local area network). In one or more embodiments, a remote access controller may include and/or provide one or more internal private networks. For example, the remote access controller may include and/or provide one or more of an Ethernet interface, a front panel universal serial bus (USB) interface, and a Wi-Fi interface, among others.

In one or more embodiments, the remote access controller may include a certificate revocation list (CRL). For example, the remote access controller may determine if a received certificate is included in a CRL. For instance, if the received certificate is included in the CRL, the remote access controller may not grant access to the APIs of the information handling system firmware. In one or more embodiments, the remote access controller may include a hidden root key (HRK).

In one or more embodiments, a hardware security module (HSM) may store a certificate. In one or more embodiments, a private key and a public key pair may be installed on a HSM. For example, the private key and the public key pair may be signed. In one instance, the private key and the public key pair may be signed by a certificate authority (CA). In anther instance, the private key and the public key pair may be signed by a brand entity (e.g., Dell Products, L.P., ACME Devices, Inc., etc.). In one or more embodiments, a CA may be or include a brand entity. In one or more embodiments, commands may be provided to a HSM. For example, a HSM may receive a command and encrypt the command with a private key of the HSM. For instance, the HSM may provided information encrypted with the private key of the HSM to an information handling system. In one or more embodiments, the private key is allowed and/or permitted to sign API grants. In one or more embodiments, an information handling system may be instructed to exit a factory installation mode. For example, the information handling system may be instructed to exit the factory installation mode after an amount of time transpires. For instance, the information handling system may be instructed to exit the factory installation mode after an average burn-in/cycle time.

Turning now to FIG. 1, an exemplary information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, and a RAC 190. As illustrated, volatile memory medium 150, non-volatile memory media 160 and 170, I/O subsystem 175, network interface 180, and RAC 190 may be communicatively coupled to processor 120.

In one or more embodiments, one or more of volatile memory medium 150, non-volatile memory media 160 and 170, I/O subsystem 175, network interface 180, and RAC 190, among others, may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, RAC 190 may be or include an embedded controller. In one or more embodiments, RAC 190 may be or include a microcontroller. For example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, RAC 190 may be or include one or more of a field programmable gate array (FPGA) and an application specific integrated circuit (ASIC), among others, configured, coded, and/or encoded with instructions in accordance with one or more of systems, flowcharts, methods, and/or processes described herein.

In one or more embodiments, processor 120 and one or more components of IHS 110 may be included in a system-on-chip (SoC). For example, the SoC may include processor 120 and a platform controller hub (not specifically illustrated).

Figure 2:
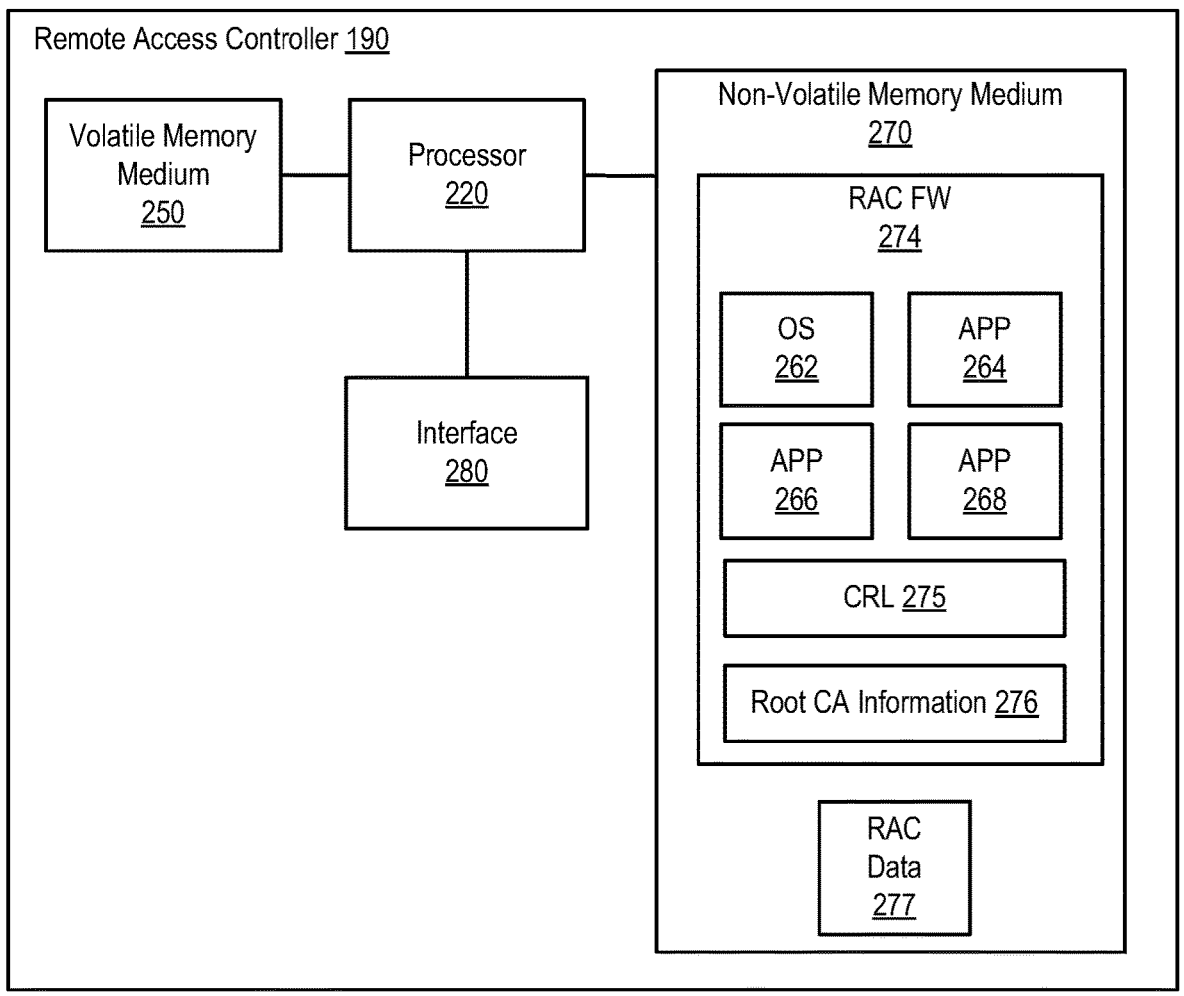
FIG. 2 illustrates an example remote access controller, according to one or more embodiments.

Turning now to FIG. 2, an example remote access controller is illustrated, according to one or more embodiments. As shown, RAC 190 may include a processor 220, a volatile memory medium 250, a non-volatile memory medium 270, and an interface 280. As illustrated, non-volatile memory medium 274 may include an RAC FW 274, which may include an OS 262 and APPs 264-268, and may include RAC data 277. For example, OS 262 may be or include a real-time operating system (RTOS). As shown, RAC FW 274 may include a CRL 275. For example CRL 275 may include information associated with one or more digital certificates that may not be utilized with RAC 190 and/or one or more information handling system firmware APIs.

As illustrated, RAC FW 274 may include root CA information 276. In one or more embodiments, root CA information 276 may include address information that RAC 190 may utilize to communicate with a root authority. In one or more embodiments, root CA information 276 may include a key (e.g., a public key of the root authority) that may be utilized to authenticate a certificate as being issued from the root authority. For example, the certificate may be issued from a root authority. For instance, the certificate may include one or more permissions of APIs. In one or more embodiments, the root authority may issue the certificate with one or more permissions for one or more respective APIs. For example, RAC 190 may utilize the one or more permissions for one or more respective APIs to grant or deny access to the one or more respective APIs.

In one or more embodiments, interface 280 may include circuitry that enables communicatively coupling to one or more devices. In one example, interface 280 may include circuitry that enables communicatively coupling to one or more buses. In a second example, interface 280 may include circuitry that enables one or more interrupt signals to be received. For instance, interface 280 may include general purpose input/output (GPIO) circuitry, and the GPIO circuitry may enable one or more interrupt signals to be received and/or provided via at least one interrupt line. In another example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250.

In one or more embodiments, processor 220 may utilize RAC data 277. In one example, processor 220 may utilize RAC data 277 via non-volatile memory medium 270. In another example, one or more portions of RAC data 277 may be transferred to volatile memory medium 250, and processor 220 may utilize RAC data 277 via volatile memory medium 250.

Figure 3A:
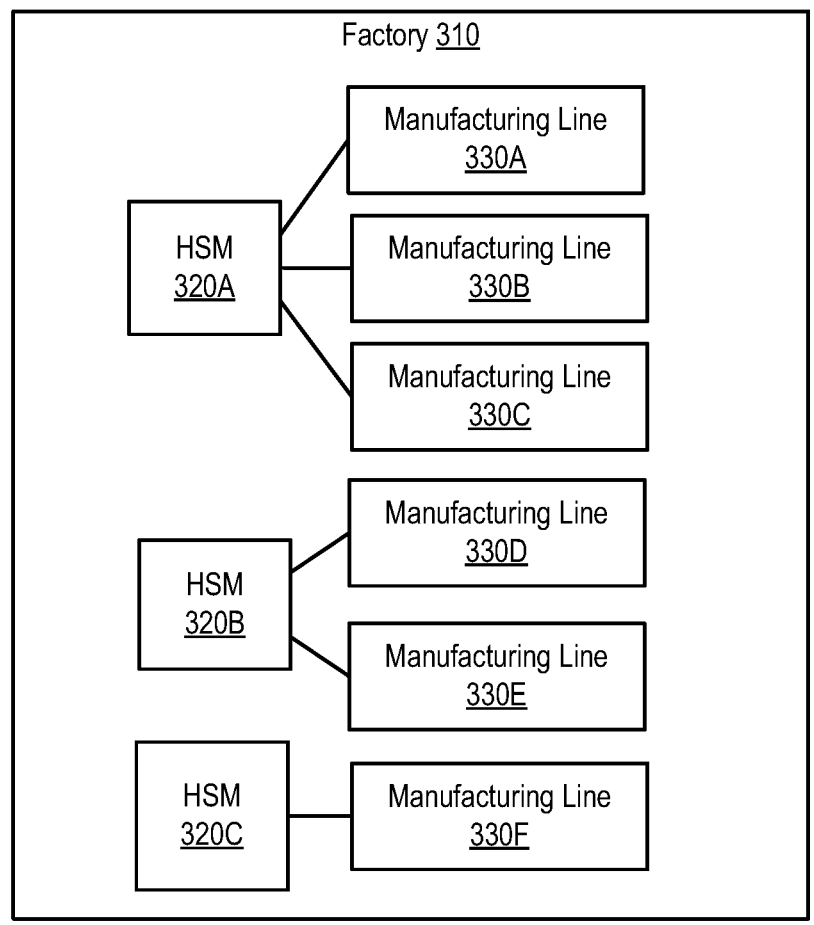
FIG. 3A illustrates an example of a factory, according to one or more embodiments.

Turning now to FIG. 3A, an example of a factory is illustrated, according to one or more embodiments. As shown, a factory 310 may include hardware security modules (HSMs) 320A-320C and manufacturing lines 330A-330F. In one or more embodiments, a factory may be configured with one or more HSMs and/or one or more manufacturing lines, among others. As illustrated, HSM 320A may be coupled to manufacturing lines 330A-330C. As shown, HSM 320B may be coupled to manufacturing lines 330D and 330E. As illustrated, HSM 320C may be coupled to manufacturing line 330F.

In one or more embodiments, a HSM may be or include a physical computing device that may safeguard and/or manage digital keys for strong authentication and/or may provide cryptographic processing. In one example, a HSM may be or include a plug-in card that may be coupled to an information handling system and/or a network. In a second example, a HSM may be or include an external device that may be coupled to an information handling system and/or a network. In another example, a HSM may include one or more structures and/or functionalities as those described with reference to IHS 110. In one or more embodiments, a HSM may include controls that may provide evidence of tampering. For example, a HSM may provide evidence of tampering via logging and/or alerting, among others. In one or more embodiments, a HSM may provide tampering resistance. For example, a HSM may delete one or more keys upon based at least on a determination of tampering. In one or more embodiments, a HSM may include one or more cryptographic processor ICs. For example, a cryptographic processor IC may be utilized in determining tampering. For instance, a cryptographic processor IC may determine that a bus is probed.

In one or more embodiments, a HSM may securely backup one or more keys that the HSM utilizes and/or accesses. In one example, a HSM may securely backup one or more keys via a wrapped form of an operating system. In another example, a HSM may securely backup one or more keys via a smartcard and/or another security token device. In one or more embodiments, HSMs may be utilized in various infrastructures. In one example, one or more HSMs may be utilized in one or more manufacturing processes. In a second example, one or more HSMs may be utilized in one or more online banking applications. In another example, one or more HSMs may be utilized in one or more public key infrastructures. In one or more embodiments, a HSM may be configured to execute one or more modules within a secure environment of the HSM. For example, the one or more modules may be configured to implement one or more processes and/or one or more methods. For instance, the one or more processes and/or the one or more methods may be executed via a secure environment of the HSM. In one or more embodiments, the one or more modules may be configured via one or more programming languages. For example, the languages may include one or more of C, C4, C++, and Java, among others. In one or more embodiments, a HSM may provide one or more benefits of securing application-specific methods and/or processes. For example, a HSM may secure an application specific module via an execution engine. In one instance, securing an application specific module via an execution engine may protect a status of the HSM for a FIPS (Federal Information Processing Standards) validation. In another instance, securing an application specific module via an execution engine may protect a status of the HSM for a Common Criteria validation (e.g., a Common Criteria for Information Technology Security Evaluation validation).

Figure 3B:
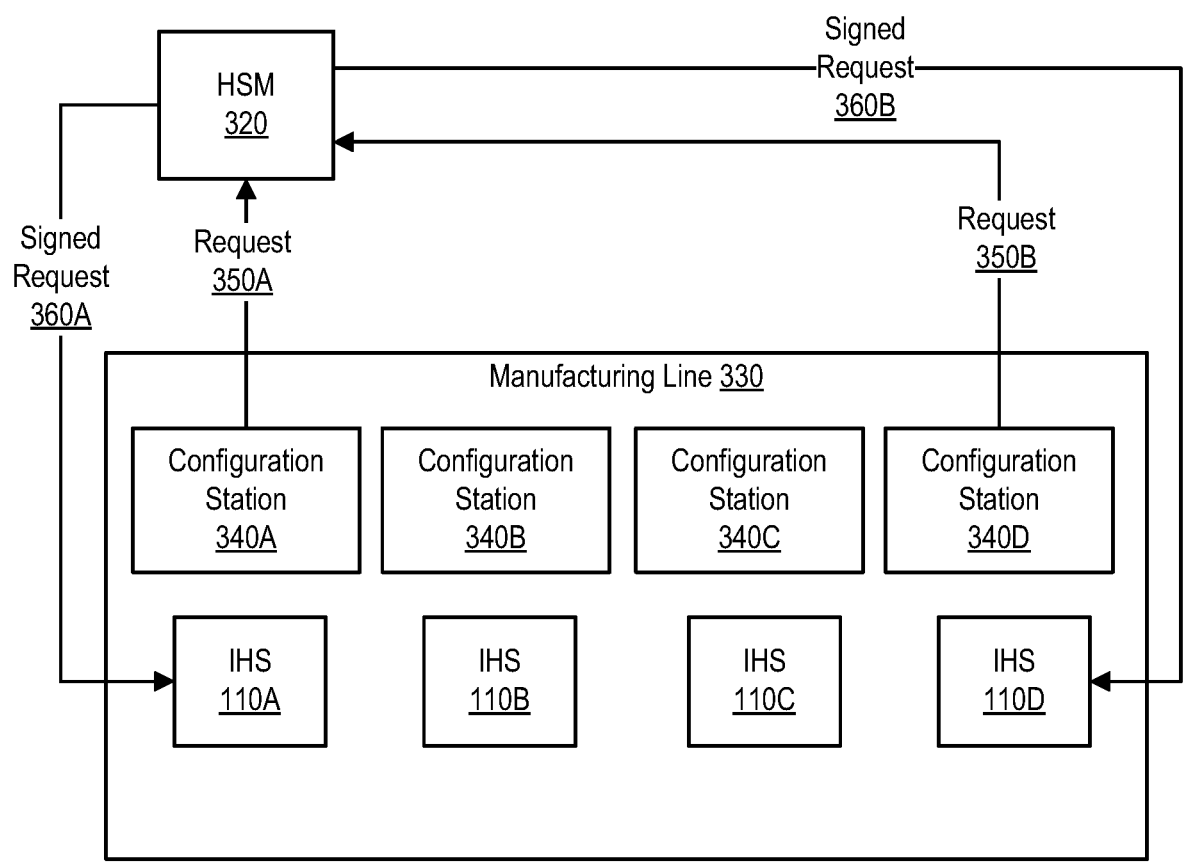
FIG. 3B illustrates an example of a manufacturing line, according to one or more embodiments.

Turning now to FIG. 3B, an example of a manufacturing line is illustrated, according to one or more embodiments. As shown, a manufacturing line 330 may include configuration stations 340A-340D. For example, configuration stations 340A-340D may configure information handling systems (IHSs) 110A-110D, respectively. In one or more embodiments, a configuration station 340 may provide a request 350 for utilization of an API to HSM 320. As illustrated, configuration station 340A may provide a request 350A for utilization of an API to HSM 320. As shown, configuration station 340B may provide a request 350B for utilization of an API to HSM 320. In one or more embodiments, HSM 320 may sign the request and may provide a signed request 360 to IHS 110. As illustrated, HSM 320 may provide a signed request 360A to IHS 110A. For example, providing signed request 360A to IHS 110A may include providing signed request 360A to a remote access controller of IHS 110A. As shown, HSM 320 may provide a signed request 360B to IHS 110D. For example, providing signed request 360B to IHS 110D may include providing signed request 360B to a remote access controller of IHS 110D. In one or more embodiments, configuration station 340 may utilize the API after the request has been authorized by a RAC 190 of IHS 110.

Figure 4:
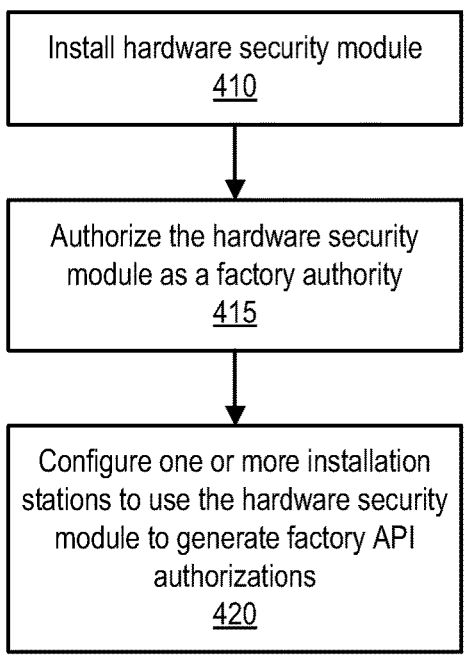
FIG. 4 illustrates an example of a method of configuring a factory, according to one or more embodiments.

Turning now to FIG. 4, an example of a method of configuring a factory is illustrated, according to one or more embodiments. At 410, a hardware security module may be installed. For example, a factory that manufactures and/or configures information handling systems may install a hardware security module. For instance, the factory may purchase the hardware security module from a vendor and setup the hardware security module.

At 415, the hardware security module may be authorized as a factory authority. In one or more embodiments, authorizing the hardware security module as a factory authority may include the hardware security module generating a public key and a private key pair. For example, the public key and the private key pair may be utilized in granting access to the APIs of the information handling system firmware. In one or more embodiments, the public key may be provided to a certificate authority (CA). For example, the CA may issue, to the hardware security module, a digital certificate certify ownership of the public key. For instance, this may allow, permit, and/or enable a remote access controller to rely on one or more signatures and/or assertions made about the private key that corresponds to the public key that the CA certified.

In one or more embodiments, the digital certificate may be formatted in accordance with a X.509 standard. For example, the digital certificate may be or include a X.509 certificate. In one or more embodiments, a CA may be a brand of information handling systems. For example, the brand of information handling systems may be or include Dell Products, L.P. For instance, the CA may be or include a root authority of Dell Products, L.P. In one or more embodiments, the hardware security module may install and/or store a signed certificate, associated with the public key, from the brand of information handling systems (e.g., a CA). In one or more embodiments, various certificate authorities (CAs) may be utilized.

At 420, one or more installation stations may be configured to utilize the hardware security module to generate factory API authorizations. For example, one or more configuration stations 340 may be configured to utilize HSM 320 to generate factory API authorizations. In one or more embodiments, configuring one or more installation stations to utilize the hardware security module to generate factory API authorizations may include configuring one or more manufacturing lines to utilize the hardware security module to generate factory API authorizations. In one example, one or more of manufacturing lines 330A-330C may be configured to utilize HSM 320A. In a second example, one or more of manufacturing lines 330D and 330C may be configured to utilize HSM 320B. In another example, manufacturing line may be configured to utilize HSM 320C.

Figure 5:
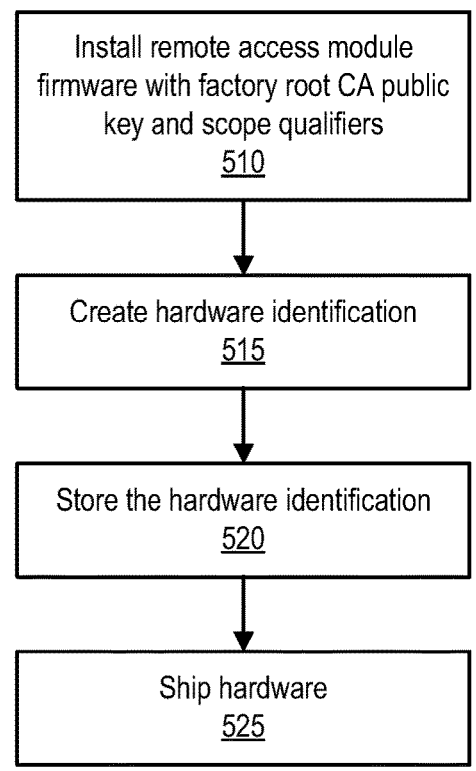
FIG. 5 illustrates an example of a method of configuring an information handling system, according to one or more embodiments.

Turning now to FIG. 5, an example of a method of configuring an information handling system is illustrated, according to one or more embodiments. At 510, remote access module firmware with a root CA public key and scope qualifiers may be installed. For example, remote access module firmware with a root CA public key and scope qualifiers may be installed on a remote access module. In one or more embodiments, scope qualifiers may include one or more permissions that may permit, allow, and/or enable one or more actions and/or one or more of the APIs of the information handling system firmware to be utilized. In one example, the scope qualifiers may include one or more permissions that permit, allow, and/or enable a factory to configure a MAC address of an information handling system. In a second example, the scope qualifiers may include one or more permissions that permit, allow, and/or enable a factory to configure a PPID of a component of an information handling system. In a third example, the scope qualifiers may include one or more permissions that permit, allow, and/or enable one or more types of manufacturing. In one instance, the scope qualifiers may include one or more permissions that permit, allow, and/or enable granting a factory to access one or more APIs of a first model of information handling system. In another instance, the scope qualifiers may include one or more permissions that may not permit, allow, and/or enable granting a factory to access one or more APIs of a second model of information handling system, different from the first model of information handling system. In a fourth example, the scope qualifiers may include one or more hardware identifiers, that may be utilized to identify hardware with which access of one or more APIs may be granted. In one instance, a hard identifier may identify a make and/or a model of a piece of hardware or a hardware component. In another instance, a hard identifier may uniquely identify a piece of hardware or a hardware component. In another example, the scope qualifiers may include one or more permissions that permit, allow, and/or enable a factory "root", "administrator", and/or "super user" access of the information handling system firmware. In one or more embodiments, the remote access module firmware may be compiled, built, and/or configured and then provided to a manufacturer of one or more components of an information handling system. For example, the manufacturer of the one or more components of the information handling system may produce one or more of a remote access module, a motherboard, a printed circuit board (PCB), and an assembled PCB (e.g., a PCB with components soldered to the PCB), among others.

At 515, a hardware identification may be created. For example, a hardware identification may be created for the remote access module. In one instance, the hardware identification may be or include a PPID. In another instance, the hardware identification may be or include a universally unique identifier (UUID). At 520, the hardware identification may be stored on the remote access controller. In one or more embodiments, storing the hardware identification on the remote access controller may include permanently storing the hardware identification on the remote access controller. For example, the hardware identification "fused" in the remote access controller. In one or more embodiments, a hidden root key may be installed on the remote access module. For example, storing the hardware identification on the remote access controller may include storing a hidden root key on the remote access module. At 525, hardware may be shipped. For example, hardware may be shipped to factory 310. For instance, a motherboard that was produced and/or configured may be shipped to factory 310.

Figure 6A:
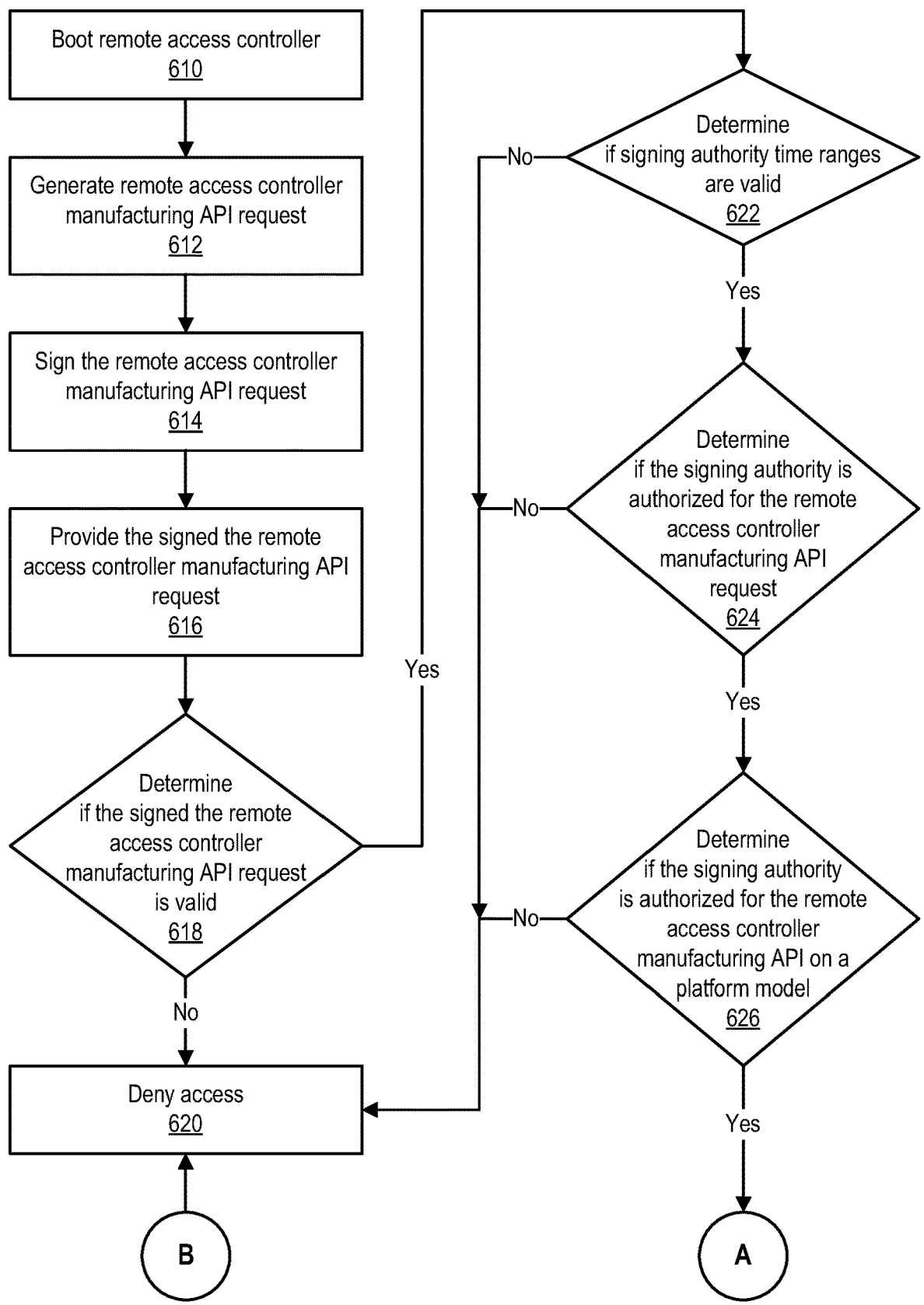
FIGS. 6A and 6B illustrate an example of another method of configuring a information handling system is illustrated, according to one or more embodiments.
Figure 6B:
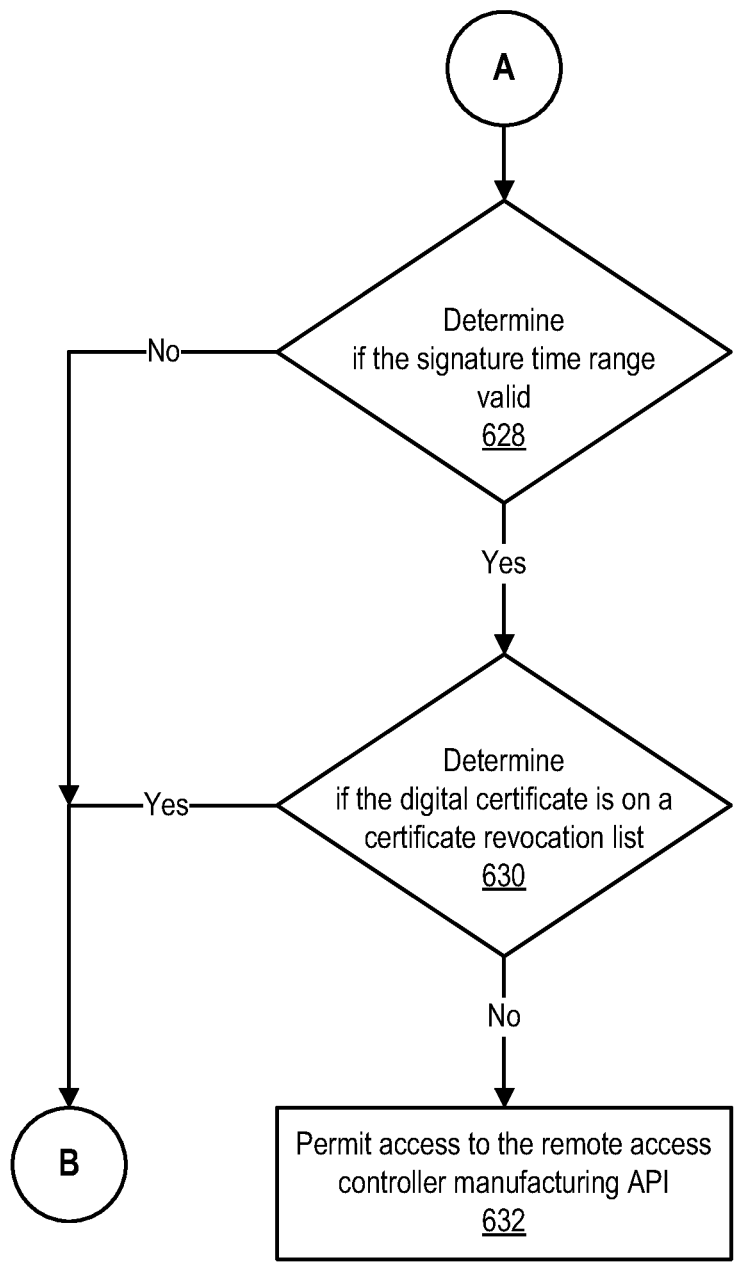

Turning now to FIGS. 6A and 6B, an example of another method of configuring a information handling system is illustrated, according to one or more embodiments. At 610, a remote access controller may be booted. For example, RAC 190 may begin to execute RAC FW 270. At 612, a remote access controller manufacturing API request may be generated. For example, HSM 320 may generate a remote access controller manufacturing API request. For instance, HSM 320 may generate the remote access controller manufacturing API request in response to receiving request 350 from configuration station 340.

At 614, the remote access controller manufacturing API request may be signed. For example, HSM 320 may sign the remote access controller manufacturing API request. For instance, HSM 320 may sign the remote access controller manufacturing API request with a private key of HSM 320. In one or more embodiments, the private key of HSM 320 may be associated with a public key of HSM 320. For example, the public key of HSM 320 may be the public key of a certificate of HSM 320 that was signed by a CA. For instance, the CA may be or include a brand of information handling systems (e.g., Dell Products, L.P., ACME Devices, Inc., etc.).

At 616, the signed the remote access controller manufacturing API request may be provided to the remote access controller. For example, the manufacturing process may provide the signed the remote access controller manufacturing API request to the remote access controller. For instance, HSM 320 may provide signed request 360 to a remote access controller of IHS 110. At 618, it may be determined if the signed the remote access controller manufacturing API request is valid. For example, the remote access controller may determine if the signed the remote access controller manufacturing API request is valid.

If the signed the remote access controller manufacturing API request is not valid, access may be denied, at 620. For example, the remote access controller may deny the remote access controller manufacturing API request. If the signed the remote access controller manufacturing API request is valid, it may be determined if the signing authority time ranges are valid, at 622. For example, the remote access controller may determine if the signing authority time ranges are valid. For instance, a time range for the signing authority may include a specific year. If the signing authority time ranges are not valid, access may be denied, at 620.

If the signing authority time ranges are valid, it may be determined if the signing authority is authorized for the remote access controller manufacturing API request, at 624. For example, the remote access controller may determine if the signing authority is authorized for the remote access controller manufacturing API request. For instance, the remote access controller may determine if the signing authority is authorized for the remote access controller manufacturing API request from one or more scope qualifiers that may be included in the digital certificate of the HSM.

In one or more embodiments, the digital certificate of the HSM may include one or more identifiers that are associated with one or more remote access controller manufacturing APIs. For example, if a remote access controller manufacturing API request is not associated with at least one of the one or more identifiers that are associated with the one or more remote access controller manufacturing APIs, the remote access controller manufacturing API request may be denied. For instance, the remote access controller may evaluate one or more identifiers that are associated with one or more remote access controller manufacturing APIs of the digital certificate of the HSM, and if at least one of the one or more identifiers that are associated with the one or more remote access controller manufacturing APIs is not found, the remote access controller manufacturing API request may be denied. Otherwise, if at least one of the one or more identifiers that are associated with the one or more remote access controller manufacturing APIs is found, the remote access controller may authorize access to a remote access controller manufacturing API associated with the remote access controller manufacturing API request.

If the signing authority is not authorized for the remote access controller manufacturing API request, access may be denied, at 620. If the signing authority is authorized for the remote access controller manufacturing API request, it may be determined if the signing authority is authorized for utilizing the remote access controller manufacturing API on a platform model, at 626. If the signing authority is not authorized for utilizing the remote access controller manufacturing API on the platform model, access may be denied, at 620. If the signing authority is authorized for utilizing the remote access controller manufacturing API on the platform model, it may be determined if the signing authority is authorized for utilizing the remote access controller manufacturing API on a specific system, at 626.

In one or more embodiments, determining if the signing authority is authorized for utilizing the remote access controller manufacturing API on a specific system may include determining if a hardware identification matches. For example, the remote access controller manufacturing API may include a first hardware identification, and the remote access controller may store a second hardware identification. For instance, the determining if the signing authority is authorized for utilizing the remote access controller manufacturing API on the specific system may include determining if the first hardware identification matches the second hardware identification. In one or more embodiments, a hardware identification may be or include, a one-way hash, a cryptographic hash and/or a UUID.

If the signing authority is not authorized for utilizing the remote access controller manufacturing API on the specific system, access may be denied, at 620. If the signing authority is authorized for utilizing the remote access controller manufacturing API on the specific system, it may be determined if the signature time range is valid, at 628. In one or more embodiments, determining if the signature time range is valid may include determining if a current time (e.g., a time of day, date, etc.) falls within a time range that the signing authority may sign the remote access controller manufacturing API request. For example, the a time range that the signing authority may sign the remote access controller manufacturing API request may include one or more weeks, one or more months, one or more years, etc.

If the signature time range is not valid, access may be denied, at 620. If the signature time range is valid, it may be determined if the digital certificate is on a certificate revocation list, at 630. In one or more embodiments, a certificate revocation list may be stored by the remote access controller. For example, a certificate revocation list may be stored via the firmware of the remote access controller. In one or more embodiments, a certificate revocation list may be obtained via a network. For example, the remote access controller may obtain a certificate revocation list via a network.

If the digital certificate is on the certificate revocation list, access may be denied at 620. If the digital certificate is not on the certificate revocation list, access to the remote access controller manufacturing API may be permitted at 632. In one or more embodiments, after access to the remote access controller manufacturing API is permitted, a username and a password combination may be utilized in accessing one or more of the remote access controller and the remote access controller manufacturing API. In one or more embodiments, an information handling system may be instructed to exit a factory installation mode after the remote access controller manufacturing API is utilized. For example, the information handling system may be instructed to exit the factory installation mode after an amount of time transpires. For instance, the information handling system may be instructed to exit the factory installation mode after an average burn-in/cycle time. In one or more embodiments, utilization of another information handling system firmware API may be permitted without authorization.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor;
   a memory medium that is coupled to the at least one processor and that stores information handling system firmware, executable by the at least one processor; and
   a remote access controller that is coupled to the at least one processor;
   wherein the remote access controller is configured to:
      receive a digital signature, signed by a signing authority, for a request for utilization of an information handling system firmware application programming interface (API) of the information handling system firmware, signed based at least on information associated with a certificate signed by a certificate authority;
      decrypt the digital signature, utilizing a public key associated with the certificate, to determine a first hash value;
      determine a second hash value of the request for utilization of the information handling system firmware API;
      determine that the first hash value matches the second hash value;
      determine that the signing authority is authorized for the request for utilization of the information handling system firmware API;
      determine that the signing authority is authorized for the request for utilization of the information handling system firmware API on a platform model of the information handling system;
      permit utilization of the information handling system firmware API; and
      permit, without authentication, utilization of another information handling system firmware API.

2. The information handling system of claim 1, wherein the remote access controller is further configured to determine that the certificate is not on a certificate revocation list.

3. The information handling system of claim 2,
   wherein firmware of the remote access controller includes the certificate revocation list; and
   wherein, to determine that the certificate is not on the certificate revocation list, the remote access controller is further configured to access the firmware of the remote access controller for the certificate revocation list.

4. The information handling system of claim 1, wherein, to determine that the signing authority is authorized for the request for utilization of the information handling system firmware API, the remote access controller is further configured to:
   determine one or more scope qualifiers from the certificate; and
   determine that at least one of the one or more scope qualifiers is associated with utilization of the information handling system firmware API.

5. The information handling system of claim 1, wherein the information handling system firmware API is configured to configure at least a portion of the information handling system.

6. The information handling system of claim 1, wherein the remote access controller is further configured to:
   determine a current time; and
   determine that the current time satisfies a timing constraint of the certificate.

7. A method, comprising:
   a remote access controller, of an information handling system, receiving a digital signature, signed by a signing authority, for a request for utilization of an information handling system firmware application programming interface (API), signed based at least on information associated with a certificate signed by a certificate authority;
   the remote access controller decrypting the digital signature, utilizing a public key associated with the certificate, to determine a first hash value;
   the remote access controller determining a second hash value of the request for utilization of the information handling system firmware API;
   the remote access controller determining that the first hash value matches the second hash value;
   the remote access controller determining that the signing authority is authorized for the request for utilization of the information handling system firmware API;
   the remote access controller determining that the signing authority is authorized for the request for utilization of the information handling system firmware API on a platform model of the information handling system;
   the remote access controller permitting utilization of the information handling system firmware API; and
   the remote access controller permitting, without authorization, utilization of another information handling system firmware API.

8. The method of claim 7, further comprising:
the remote access controller determining that the certificate is not on a certificate revocation list.

9. The method of claim 8,
wherein firmware of the remote access controller includes the certificate revocation list; and
wherein the remote access controller determining that the certificate is not on the certificate revocation list includes the remote access controller accessing the firmware of the remote access controller for the certificate revocation list.

10. The method of claim 7, wherein the remote access controller determining that the signing authority is authorized for the request for utilization of the information handling system firmware API includes:
determining one or more scope qualifiers from the certificate; and
determining that at least one of the one or more scope qualifiers is associated with utilization of the information handling system firmware API.

11. The method of claim 7, wherein the information handling system firmware API is configured to configure at least a portion of the information handling system.

12. The method of claim 7, further comprising:
the remote access controller determining a current time; and
the remote access controller determining that the current time satisfies a timing constraint of the certificate.

13. A remote access controller, comprising:
at least one processor;
a memory medium that is coupled to the at least one processor and that stores firmware that includes instructions, which when executed by the at least one processor, cause the remote access controller to:
receive a digital signature, signed by a signing authority, for a request for utilization of an information handling system firmware application programming interface (API) of the information handling system firmware, signed based at least on information associated with a certificate signed by a certificate authority;
decrypt the digital signature, utilizing a public key associated with the certificate, to determine a first hash value;
determine a second hash value of the request for utilization of the information handling system firmware API;
determine that the first hash value matches the second hash value;
determine that the signing authority is authorized for the request for utilization of the information handling system firmware API;
determine that the signing authority is authorized for the request for utilization of the information handling system firmware API on a platform model of the information handling system;
determine that the certificate is not on a certificate revocation list;
permit utilization of the information handling system firmware API; and
permit, without authentication, utilization of another information handling system firmware API.

14. The remote access controller of claim 13, wherein the instructions further cause the remote access controller to determine that the certificate is not on a certificate revocation list.

15. The remote access controller of claim 14,
wherein firmware of the remote access controller includes the certificate revocation list; and
wherein, to determine that the certificate is not on the certificate revocation list, the instructions further cause the remote access controller to access the firmware of the remote access controller for the certificate revocation list.

16. The remote access controller of claim 1, wherein, to determine that the signing authority is authorized for the request for utilization of the information handling system firmware API, the instructions further cause the remote access controller:
determine one or more scope qualifiers from the certificate; and
determine that at least one of the one or more scope qualifiers is associated with utilization of the information handling system firmware API.

17. The remote access controller of claim 13, wherein the information handling system firmware API is configured to configure at least a portion of the information handling system.

18. The remote access controller of claim 13, wherein the instructions further cause the remote access controller to:
determine a current time; and
determine that the current time satisfies a timing constraint of the certificate.

* * * * *